INVENTORS
Ernest W. Posse
Charles E. Rutledge
BY
S. J. Rotondi & A. T. Dupont

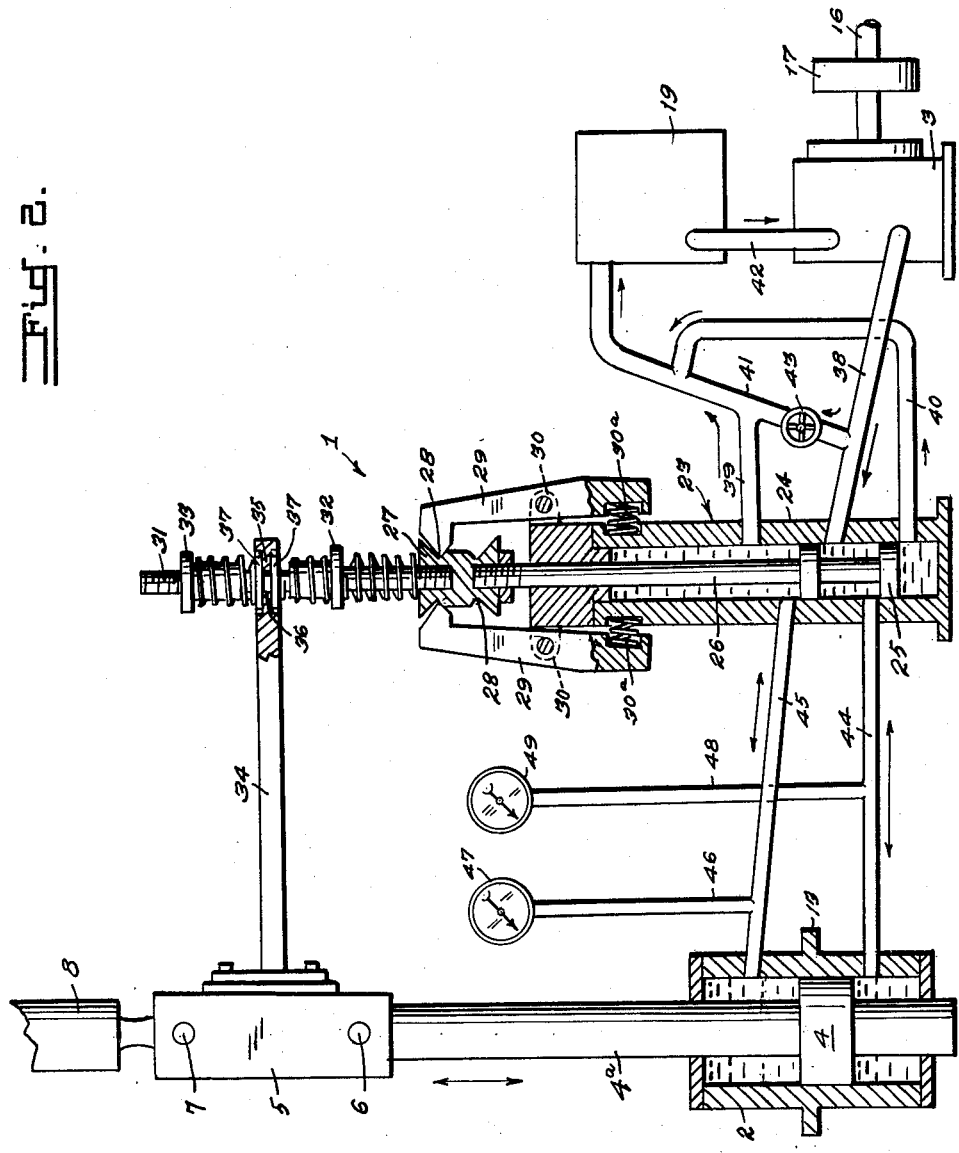

United States Patent Office 3,148,529
Patented Sept. 15, 1964

3,148,529
MACHINE FOR TESTING SHOCK ABSORBERS
Ernest W. Posse, Fort Knox, and Charles E. Rutledge, Vine Grove, Ky., assignors to the United States of America as represented by the Secretary of the Army
Filed Feb. 5, 1962, Ser. No. 171,322
1 Claim. (Cl. 73—11)
(Granted under Title 35, U.S. Code (1952), sec. 266)

The invention described herein may be manufactured and used by or for the Government for governmental purposes without the payment to us of any royalty thereon.

This invention relates to a machine for testing shock absorbers and more particularly to a machine for testing whether or not a shock absorber, used in heavy equipment such as tanks, personnel carriers and like vehicles, is functioning properly.

Heretofore, the procedure in testing heavy shock absorbers was to drive the vehicle about five miles and then feel the shock absorbers by hand and if they felt warm they were considered satisfactory.

The aforesaid method was not accurate and resulted in the rejection of shock absorbers that could be reclaimed at very little expense.

The present invention, through tests, has resulted in the reclamation of approximately 50% of the heretofore rejected shock absorbers.

Another method was devised to "exercise" the shock absorbers instead of using the aforesaid "feel" method. The shock absorber was attached to a machine which alternately pulled and compressed the shock absorber to subject it to the equivalent road test; however the machines were extremely complicated and heavy.

The present invention is designed to replace the aforesaid complicated machines. A shock absorber is mounted on one end of a piston which is reciprocated by hydraulic fluid under pressure. The other end of the shock absorber is attached to a stationary amount. The fluid is pumped to the piston and the piston alternately expands and compresses the shock absorber so that readings can be made from gages. It is only necessary to exercise the shock absorber until the readings can be made.

The gages indicate the amount of force that is required to expand and compress the shock absorbers at 50 cycles per minute over a stroke of the piston of about three inches.

It is an object of this invention to test the performance of a shock absorber by subjecting it to the same conditons as it is subjected to when in use on a vehicle road test.

It is another object to test a shock absorber by securing it at one end to a stationary mount and at its other end to a hydraulically actuated reciprocaing piston which alternately expands and compresses the shock absorber.

It is a further object to provide a machine for testing a shock absorber more accurately than the former method of testing the shock absorber by hand.

It is a still further object to provide a machine that is more simple and efficient than the complicated machines presently in use.

The specific nature of the invention as well as other objects and advantages thereof, will clearly appear from a description of a preferred embodiment, as shown in the accompanying drawings in which:

FIGURE 2 is a schematic layout of the machine of FIGURE 1.

Figure 1:
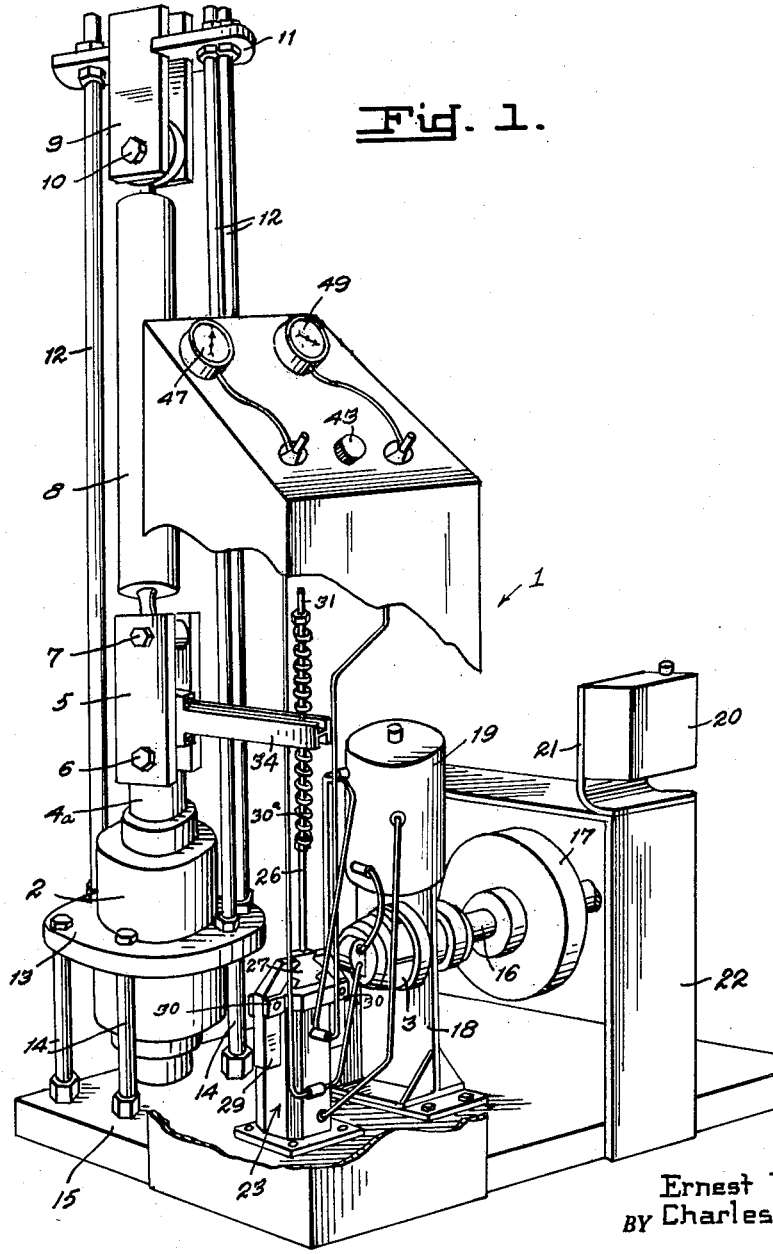
FIGURE 1 is a perspective view of the machine of the invention.

Referring more particularly to the drawings, reference character 1 represents the machine in its entirety.

The machine 1 consists of an equal displacement hydraulic cylinder 2 having hydraulic fluid supplied under pressure thereto by a hydraulic pump indicated by 3. A piston 4 mounted on one end of a rod 4a is slidable, at its lower end, in cylinder 2 and is attached at its upper end to the lower end of a linkage 5 by a pin 6. Linkage 5 is attached at its upper end by a pin 7 to the lower end of a shock absorber 8 when the shock absorber is mounted in the machine for testing, and the upper end of the shock absorber is attached to a second linkage 9 by a pin 10. Linkage 9 is stationary, being immobilized by a support 11 which is carried by supporting rods 12 which, in turn, are secured to a flange 13 carried by cylinder 2.

Cylinder 2 is supported by rods 14 which are secured to flange 13 and a base 15.

Pump 3 is mounted on a shaft 16. A fly-wheel 17 is also mounted on shaft 16 and serves to maintain practically constant pump speed. Shaft 16 may be driven by an electric motor (not shown).

Means for controlling the motor (not shown) is indicated generally at 20 and is mounted on a bracket 21 to a supporting bracket 22 fixed to the base 15.

Means for controlling the direction of flow of hydraulic fluid from pump 3 to cylinder 2 is provided and consists of a spool type reversing valve indicated generally by 23 and is clearly depicted in FIGURE 2.

Valve 23 comprises a cylinder 24 which is mounted on base 15. A spool 25 is slidable in cylinder 24 and is integral with the lower end of a rod 26 which extends vertically from cylinder 24.

A valve position holding block 27 is threadably secured to the upper end of rod 26. Block 27 is provided with beveled notches 28 on each of its sides to receive the upper beveled ends of a pair of diametrically disposed latch members 29 which are pivotally mounted on the upper end of cylinder 24 by ears 30. Latches 29 are biased inwardly towards block 27 by spring 30ª.

Threadably mounted in block 27 is a short rod 31 which extends vertically therefrom and in axial alignment with rod 26.

A pair of spaced collars 32 and 33 are secured on the upper portion of rod 31 and an arm 34 is fixed at one of its ends to linkage 5 on piston 4. Arm 34 is provided, at its other end, with an annular reduced portion 35 provided with a central opening 36 to receive rod 31 therethrough. A pair of collars 37 fixed in spaced relation, one each adjacent above and below reduced portion 35 permits vertical movement of rods 26 and 31 with vertical movement of arm 34.

A system of conduits provides communication between pump 3, cylinder 24 and cylinder 2 for circulation of hydraulic fluid to operate piston 4.

Pump 3 is in communication with cylinder 24 by inlet conduit 38, outlet conduits 39 and 40, by-pass conduit 41 to reservoir 19 and a return conduit 42 from reservoir 19 to pump 3. A by-pass valve 43 in conduit 41 regulates flow of fluid between pump 3 and cylinder 24 and reservoir 19.

Cylinder 24 is in communication with cylinder 2 by inlet and outlet conduits 44 and 45.

Means for indicating the compression and expansion forces in the testing of a shock absorber are provided and consist of a conduit 46 leading from conduit 45 to a gage 47 which indicates the expansion force and a second conduit 48 leading from conduit 44 to a second gage 49 which indicates the compression force.

In operation, the pump is running. As long as by-pass valve 43 is closed, the hydraulic fluid will circulate under pressure through the machine. When by-pass valve 43 is open, the fluid will circulate through conduit 38, through conduit 41 to reservoir 19 and through conduit 42 back to pump 3 and no action will take place.

To test a shock absorber in the machine, it is attached at one of its ends to stationary support linkage 9 by pin 10 and at its other end to linkage 5 by pin 7. Adjustment of the piston 4 is made by manipulation of valve 43 which, when closed, starts the operation cycle of the machine.

After the shock absorber 8 has been secured in its testing position, valve 43 is again closed and fluid circulates through inlet conduit 38 into cylinder 24 and through conduit 44 whereby piston 4 will be raised to compress shock absorber 8 and the compression force will be indicated on gage 49. At the same time, arm 34 is raised which also raises rods 31, 26 and spool valve 25 to their up position.

Fluid compressed in cylinder 2 then passes through conduit 45, into cylinder 24. The fluid compressed by spool 25 enters conduit 39, through conduit 41, into reservoir 19 and returns through conduit 42 to pump 3.

For the expansion of the shock absorber 8, the fluid returns through conduit 38, into cylinder 24, through conduit 45, into cylinder 2 and moves piston 4 downward and the expansion force of the shock absorber 8 is indicated on gage 47. At the same time spool valve 25 is moved down by arm 34.

It is only necessary to observe the two aforesaid readings for testing the shock absorber, after which, the tested shock absorber may be removed and the next shock absorber may be mounted for testing in the machine.

Variations and modifications may be effected without departing from the novel concept of the present invention and the scope of the appended claim.

What is claimed is:

A machine for testing a shock absorber comprising in combination, a base, a supporting structure fixed to said base for detachable connection to one end of a shock absorber, a first cylinder secured on said base, a first rod, a piston carried by one end of said first rod and slidable in said first cylinder, the other end of said first rod being adapted for detachable connection to the other end of said shock absorber, said piston and said first rod being reciprocated in said cylinder upon admission of fluid pressure applied alternately to either side of said piston in said first cylinder, a pump supported by said base for supplying a fluid under pressure to said first cylinder, inlet and return conduits connecting said pump and said first cylinder and automatic reversing means for regulating the flow of fluid to said first cylinder whereby said first rod will alternately expand and compress said shock absorber, said reversing means comprising a second cylinder mounted on said base and in fluid connection with said inlet and return conduits, a second rod, a spool valve carried by one end of said second rod, said spool valve being slidable in said second cylinder for changing the direction of fluid flow in said inlet and return conduits, an arm fixed at one of its ends to said first rod for movement therewith, the other end of said arm being connected to the free end of said second rod, a valve positioning holding block fixed to said second rod and spaced from said cylinder, there being two sets of diametrically spaced notches on either side of said block and a pair of spring biased beveled latches pivotally mounted, one each, on diametrically opposed sides of the upper end of said second cylinder, said latches releasably and alternately engaging a set of said notches, upon reciprocation of said rod, whereby said spool valve is momentarily retained in a position to admit fluid to said second cylinder from said pump and to return fluid from said first cylinder to said pump.

References Cited in the file of this patent

UNITED STATES PATENTS

| | | |
|---|---|---|
| 2,101,228 | Willard | Dec. 7, 1937 |
| 2,660,879 | Allen | Dec. 1, 1953 |
| 2,761,308 | Euker et al. | Sept. 4, 1956 |
| 2,980,080 | Joelson | Apr. 18, 1961 |